(12) United States Patent
Ng

(10) Patent No.: US 9,046,938 B2
(45) Date of Patent: Jun. 2, 2015

(54) UNINTENDED DISPLACEMENT IDENTIFICATION AND CORRECTION METHOD AND SYSTEM

(75) Inventor: Chern Ann Ng, Singapore (SG)

(73) Assignee: RAZER (ASIA-PACIFIC) PTE LTD, Singapore (SG)

( * ) Notice: Subject to any disclaimer, the term of this patent is extended or adjusted under 35 U.S.C. 154(b) by 733 days.

(21) Appl. No.: 12/297,855

(22) PCT Filed: Oct. 19, 2007

(86) PCT No.: PCT/SG2007/000358
§ 371 (c)(1),
(2), (4) Date: Apr. 28, 2010

(87) PCT Pub. No.: WO2009/051563
PCT Pub. Date: Apr. 23, 2009

(65) Prior Publication Data
US 2010/0201624 A1    Aug. 12, 2010

(51) Int. Cl.
*G06F 3/033*    (2013.01)
*G09G 5/08*    (2006.01)
(Continued)

(52) U.S. Cl.
CPC ............ *G06F 3/03543* (2013.01); *G06F 3/038* (2013.01)

(58) Field of Classification Search
CPC ...... G06F 1/169; G06F 3/0338; G06F 3/0414
USPC .......................................... 345/156, 163, 166
See application file for complete search history.

(56) References Cited

U.S. PATENT DOCUMENTS

| 5,598,187 A | 1/1997 | Ide et al. |
| 5,825,350 A * | 10/1998 | Case et al. ..................... 345/163 |
| 5,877,748 A * | 3/1999 | Redlich .......................... 345/163 |

(Continued)

FOREIGN PATENT DOCUMENTS

| CN | 1437096 A | 8/2003 |
| CN | 1797292 | 7/2006 |

(Continued)

OTHER PUBLICATIONS

"International Search Report and Written Opinion dated Jun. 30, 2009," International Application No. PCT/SG2009/000052, 7 pages.

(Continued)

*Primary Examiner* — Matthew Fry
(74) *Attorney, Agent, or Firm* — Novak Druce Connolly Bove + Quigg LLP

(57) ABSTRACT

Substantially elevated movement sensitivity of a mouse enables improved control and finer manipulation of an object, for example a pointer, displayed on a display device. However, the elevated movement sensitivity also results in unintended movement of the mouse, generated when a button of the mouse is operated, being translated into displacement of the pointer on the display device. An embodiment of the invention describes a method for transducing movement occurring during an interval into signals in response to the button being operated. The signals are for use in manipulating the object. The method is further for comparing properties of the displacement with pre-defined reference properties to determined whether the movement is intended or unintended. The signals are subsequently terminated to impede manipulation of the object when the movement is determined to be unintended to thereby correct the unintended movement.

36 Claims, 5 Drawing Sheets

(51) Int. Cl.
*G06F 3/0354* (2013.01)
*G06F 3/038* (2013.01)

(56) References Cited

U.S. PATENT DOCUMENTS

| | | | | |
|---|---|---|---|---|
| 5,963,195 | A | * | 10/1999 | Gregg et al. .................. 345/159 |
| 6,031,522 | A | * | 2/2000 | Strand ........................... 345/163 |
| 6,034,668 | A | * | 3/2000 | Jackson ......................... 345/157 |
| 6,281,882 | B1 | | 8/2001 | Gordon et al. |
| 6,304,250 | B1 | | 10/2001 | Yang et al. |
| 6,650,313 | B2 | * | 11/2003 | Levine et al. ................. 345/156 |
| 6,948,136 | B2 | * | 9/2005 | Trewin .......................... 715/865 |
| 7,333,785 | B1 | | 2/2008 | Lavelle et al. |
| 7,986,304 | B2 | * | 7/2011 | Grunberger .................... 345/163 |
| 8,525,784 | B2 | * | 9/2013 | Benenson ..................... 345/158 |
| 8,570,147 | B2 | * | 10/2013 | Girard et al. ................. 340/5.72 |
| 2002/0093486 | A1 | | 7/2002 | Gordon et al. |
| 2004/0066371 | A1 | | 4/2004 | Huang |
| 2004/0113890 | A1 | * | 6/2004 | Ranta ........................... 345/166 |
| 2004/0189603 | A1 | | 9/2004 | Arrigo et al. |
| 2004/0201572 | A1 | | 10/2004 | Wei |
| 2006/0028449 | A1 | | 2/2006 | Ranta |
| 2006/0274042 | A1 | * | 12/2006 | Krah et al. .................... 345/163 |

FOREIGN PATENT DOCUMENTS

| | | |
|---|---|---|
| JP | 07-028591 A | 1/1995 |
| JP | H08-194580 | 7/1996 |
| JP | H11-224163 | 8/1999 |
| KR | 10-1999-0003599 | 1/1999 |

OTHER PUBLICATIONS

"Korean Office Action dated Oct. 30, 2013," Korean Application No. 10-2010-7010567, 8 pages.
"Korean Office Action dated Jun. 18, 2014," Korean Application No. 10-2010-7010567, 8 pages.
"International Preliminary Report on Patentability dated Aug. 24, 2010," International Application No. PCT/SG2009/000052, 5 pages.
"Taiwan Office Action dated Sep. 2, 2014," Taiwan Application No. 97140121, 13 pages.

* cited by examiner

UNINTENDED DISPLACEMENT IDENTIFICATION AND CORRECTION METHOD AND SYSTEM

FIELD OF INVENTION

The invention relates to a method for identifying unintended displacement generated by unintentional movement of a peripheral device. Specifically, the invention relates to a method and a system for identifying and correcting unintended displacement generated by unintentional movement of a peripheral device.

BACKGROUND

Pointer devices, a category of peripheral devices which are also conventionally known as mice, are becoming increasingly movement sensitive due to technological advancements in, for example, the transducers used therein. The use of a photoelectric transducer, for example an optical sensor-transmitter with an optical resolution in excess of 4000 dots-per-inch (dpi), in a mouse substantially elevates the movement sensitivity thereof.

The substantially elevated movement sensitivity of the mouse enables improved control and finer manipulation of an object, for example a pointer, displayed on a display device. However, the elevated movement sensitivity also results in any unintended movement of the mouse being translated into displacement of the pointer on the display device. The unintended movement of the mouse is usually generated when buttons of the mouse are operated. The force applied to the buttons for operation thereof can unintentionally move the mouse as well. The displacement of the pointer on the display device due to unintentional movement of the mouse negatively affects user experience.

One solution provides means for allowing the movement sensitivity of the mouse to be varied. However, sensitivity reduction is affront to the object of acquiring and defeats the purpose of using a high sensitivity mouse. Another solution of terminating all mouse movement detected within a pre-determined duration after any of the buttons of the mouse is operated is also undesirable as intentional movements occurring within the duration are also terminated.

Hence, these affirm a need for a method and a system for addressing the foregoing problems.

SUMMARY

In accordance with a first aspect of the invention, there is disclosed a computer implemented method comprising detecting activation of a switch and sampling displacement detected by a transducer occurring during a sampling interval in response to the switch being activated. The sampled displacement is transduced into displacement signals for manipulating an object generated by a computing device. The method further comprises determining at least one of displacement magnitude and displacement rate of the sampled displacement and identifying the displacement occurring during the sampling interval as an unintended displacement when at least one of the displacement magnitude is less than a reference magnitude and the displacement rate is less than a reference rate. The unintended displacement is identified for impeding manipulation of the object by the displacement signals.

In accordance with a second aspect of the invention, there is disclosed a system comprising a controller configured for communication with a computing device and a peripheral device. The peripheral device has a switch and a transducer. The controller comprises means for detecting activation of the switch, means for sampling displacement detected by the transducer occurring during a sampling interval in response to the switch being activated and means for determining at least one of displacement magnitude and displacement rate of the sampled displacement. The sampled displacement is transduced into displacement signals for manipulating an object generated by the computing device. The controller further comprises means for identifying the displacement occurring during the sampling interval as an unintended displacement when at least one of the displacement magnitude is less than a reference magnitude and the displacement rate is less than a reference rate. The unintended displacement is identified for impeding manipulation of the object by the displacement signals.

In accordance with a third aspect of the invention, there is disclosed an apparatus comprising a switch for signal communicating with a computing device, a transducer and a controller. The controller is configured for communicating with the computing device with the controller for detecting activation of the switch and for sampling displacement detected by the transducer occurring during a sampling interval in response to the switch being activated. The controller further determines at least one of displacement magnitude and displacement rate of the sampled displacement. The controller identifies the displacement occurring during the sampling interval as an unintended displacement when at least one of the displacement magnitude is less than a reference magnitude and the displacement rate is less than a reference rate. The sampled displacement is transduced into displacement signals for manipulating an object generated by the computing device, and the unintended displacement is identified for impeding manipulation of the object by the displacement signals.

In accordance with a fourth aspect of the invention, there is disclosed a machine-readable medium having stored therein a plurality of programming instructions, which when executed, the instructions cause the machine to detect activation of a switch, sample displacement detected by a transducer occurring during a sampling interval in response to the switch being activated with the sampled displacement being transduced into displacement signals for manipulating an object generated by a computing device, and determine at least one of displacement magnitude and displacement rate of the sampled displacement. The displacement occurring during the sampling interval is identified as an unintended displacement when at least one of the displacement magnitude is less than a reference magnitude and the displacement rate is less than a reference rate. The unintended displacement is identified for impeding manipulation of the object by the displacement signals.

BRIEF DESCRIPTION OF THE DRAWINGS

Embodiments of the invention are disclosed hereinafter with reference to the drawings, in which.

DETAILED DESCRIPTION

Figure 1:
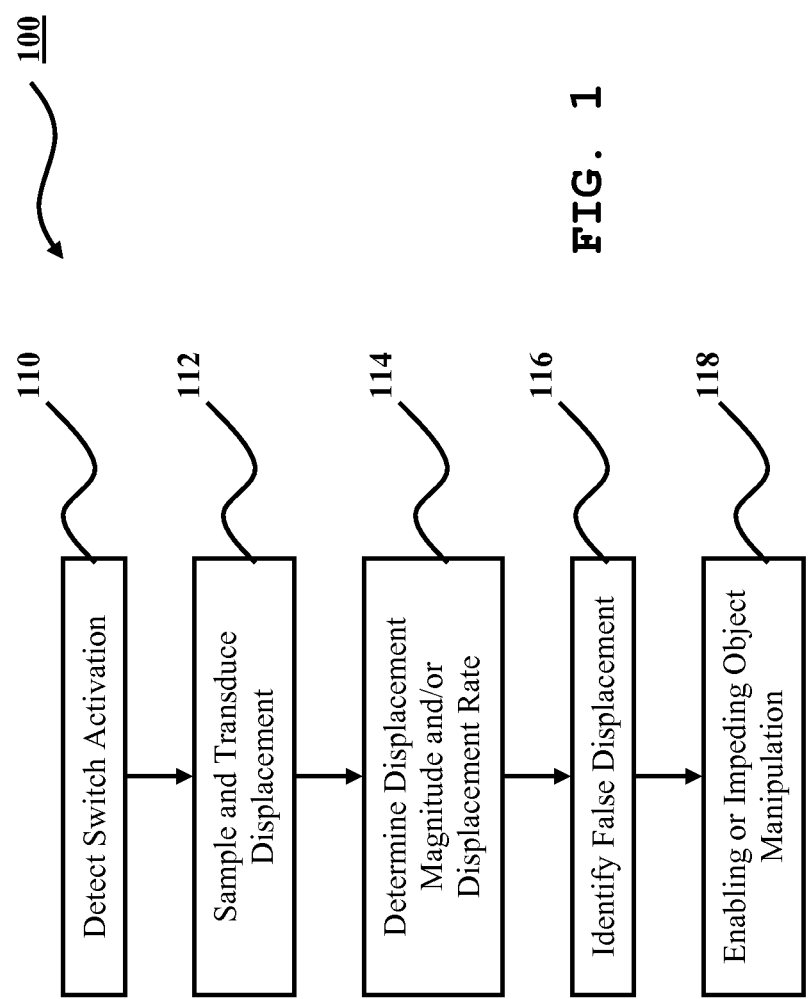
FIG. 1 shows a process flow diagram of a method for identifying and correcting unintended displacement according to an embodiment of the invention.

A method, a system and an apparatus for identifying and correcting unintended displacement are described hereinafter for addressing the foregoing problems.

For purposes of brevity and clarity, the descriptions of embodiments of the invention are limited hereinafter to peripheral devices usage in conjunction with computing devices. This however does not preclude various embodiments of the invention from other applications that require similar operating performance. The fundamental operational and functional principles of the embodiments of the invention remain common throughout the various embodiments.

An exemplary embodiment of the invention described hereinafter is in accordance with FIGS. 1 to 5 of the drawings, in which like elements are numbered with like reference numerals.

Figure 2:
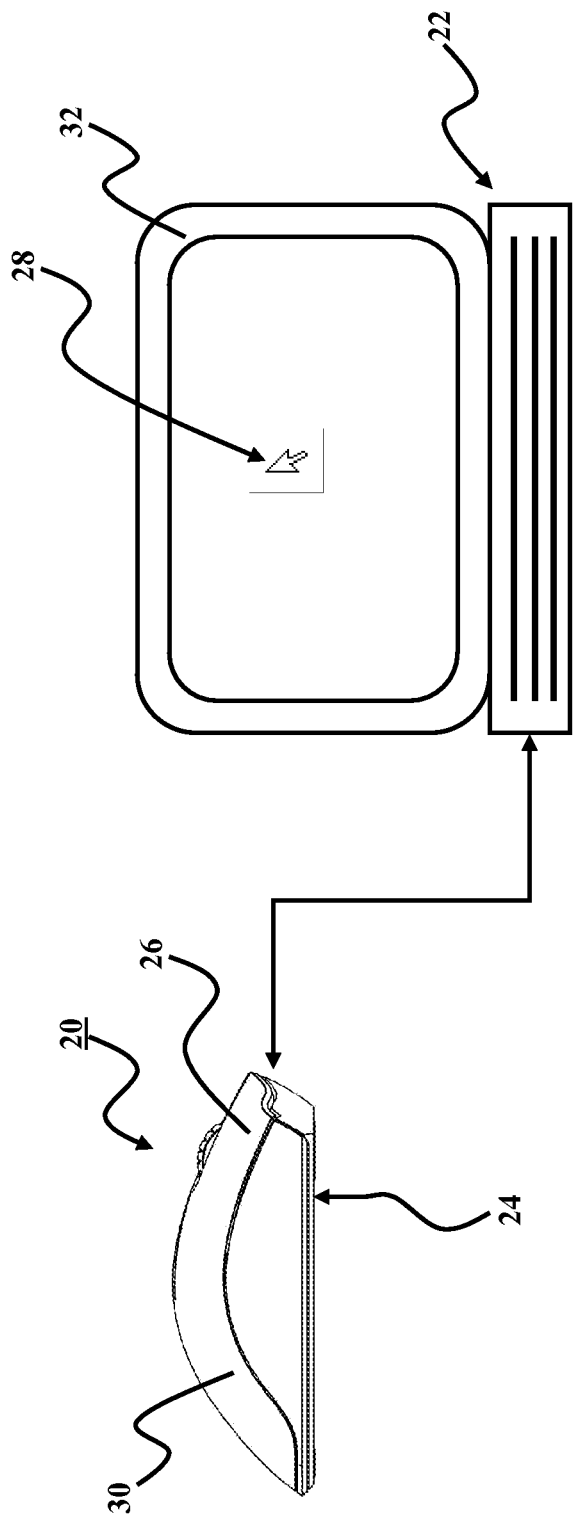
FIG. 2 shows a partial system block diagram of a peripheral device and a computing device inter-configured for implementing the method of FIG. 1.
Figure 3:
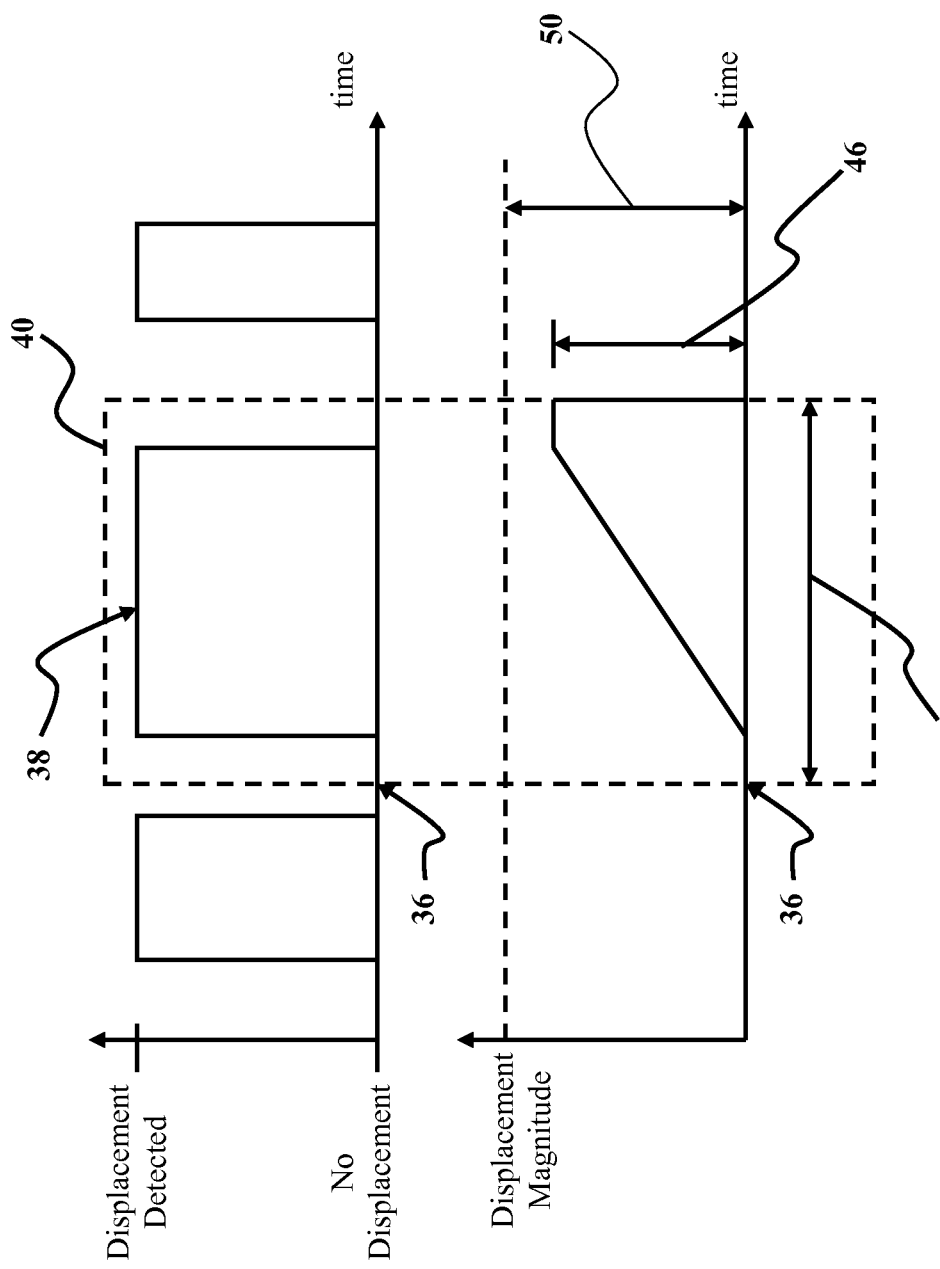
FIG. 3 shows a plot of an unintended displacement occurring within a sampling interval according to the method of FIG. 1.

An exemplary embodiment of the invention, a method 100 for identifying and correcting unintended displacement occurring during use of a peripheral device 20 in communication with a computing device 22, is described hereinafter with reference to FIGS. 1 to 3. The peripheral device 20 comprises a transducer 24 and a switch 26. Preferably, the peripheral device 20 is a pointer device, for example a mouse, with the switch 26 being a button thereof. The peripheral device 20 preferably is one of wire-coupled and wirelessly-coupled to the computing device 22 for communication therewith. The peripheral device 20 is operable for manipulating an object 28 generated by the computing device 22. The object 28 is, for example, a pointer or an object generated and manipulatable within a multi-dimensional virtual space.

The transducer 24 is preferably a photo-electric transducer, for example an infrared sensor device or a laser sensor device, for detecting displacement of the peripheral device 20 across a surface. Alternatively, the transducer 24 is an electromagnetic transducer and an electromechanical transducer. An example of an electromechanical transducer comprises multiple encoder wheels in tractive communication with a sphere rotatably coupled to the peripheral device 20. The encoder wheels rotate when the sphere is rolled across a surface for detecting displacement thereof. In a mouse configuration, the sphere is for rolling across the surface of a support. In a trackball configuration, the surface of, for example a thumb, is rolled across the sphere for rotation thereof. The switch 26 is activatable for executing a function, for example for selecting the object 28 or for executing an application, on the computing device 22. Alternatively, the switch 26 is for executing a function on another device.

Preferably, the peripheral device further comprises a body 30 for housing the transducer 24 and the switch 26. The switch 26 is preferably a mechanical switch. Alternatively, the switch is a capacitive switch or an optical switch. Further alternatively, the switch 26 is a capacitive switch formed integral with the body 30 of the peripheral device 20.

During use of the peripheral device 20, operating the switch 26 for activation thereof can result in unintended movement of the body 30 of the peripheral device 20. This unintended movement in turn translates into unintended displacement of the object 28 displayed on a display device 32 coupled to the computing device 22. A crude approach to addressing this problem is to terminate any movement detected during a truncation duration (not illustrated) after the switch 26 has been activated to prevent unintended manipulation of the object 28. However, this approach inevitably also truncates any movement intended for manipulating the object 28 but which has been detected during the truncation duration.

Therefore, the method 100 is applicable for first identifying any unintended movement prior to deciding on how the unintended movement can be addressed. The method 100 is preferably implemented as a software program, for example a driver program, executing on a processor (not shown) of the computing device 22. In a step 110 of the method 100, the computing device 22 detects for activation of the switch 28. Upon the activation of the switch 28 being detected at an activation point 36, displacement 38 occurring during a sampling interval 40 is sampled and transduced into displacement signals 42 in a step 112. The sampled displacement 38 results from operating of the peripheral device 20 by a user. The sampling interval 40 has an interval duration 44 and initiates from the activation point 36.

Next, in a step 114, displacement magnitude 46 of the sampled displacement 38 is determined. Alternatively or additionally, displacement rate of the sampled displacement 38 is also determinable in the step 114.

In a step 116, the displacement magnitude 46 of the sampled displacement 38 is then compared with a reference magnitude 50. Should the displacement magnitude 46 equal or exceed the reference magnitude 50, the sampled displacement 38 is identified as an intended displacement. However, when the displacement magnitude 46 is less than the reference magnitude 50, the sampled displacement 38 is identified as an unintended displacement.

Alternatively in the step 116, the displacement rate of the sampled displacement 38 is compared with a reference rate. Should the displacement rate equal or exceed the reference rate, the sampled displacement 38 is identified as an intended displacement. However, when the displacement rate is less than the reference rate, the sampled displacement 38 is identified as an unintended displacement.

Further alternatively in the step 116, both the displacement magnitude 46 and the displacement rate of the sampled displacement 38 are compared with the reference magnitude 50 and the reference rate respectively. Should one or both of the displacement magnitude 46 and the displacement rate equal or exceed the reference magnitude 50 and the reference rate respectively, the sampled displacement 38 is identified as an intended displacement. Else, the sampled displacement 38 is identified as an unintended displacement.

In a step 118, the computing device 22 processes the displacement signals 42 for enabling manipulation of the object 28 when the sampled displacement 38 is identified as an intended displacement. However, the computing device 22 terminates the displacement signals 42 for impeding manipulation of the object 28 thereby when the sampled displacement 38 is identified as an unintended displacement.

The method 100 enables unintended displacement of displayed objects, for example a pointer, to be identified when unintended displacement or movement is generated while operating buttons on a high sensitivity pointer device, for example an optical mouse with an optical resolution in excess of 4000 dots per inch (dpi). However, as different users have different user habits, a settings application (not illustrated) is executable on the computing device and presented as a graphical user interface (GUI) for enabling a user to define or vary the interval duration 44, the reference magnitude 50 and the reference rate. Alternatively, rotary switches or slider switches are providable on the peripheral device 20 to enable the user to vary the interval duration 44, the reference magnitude 50 and the reference rate.

Figure 4:
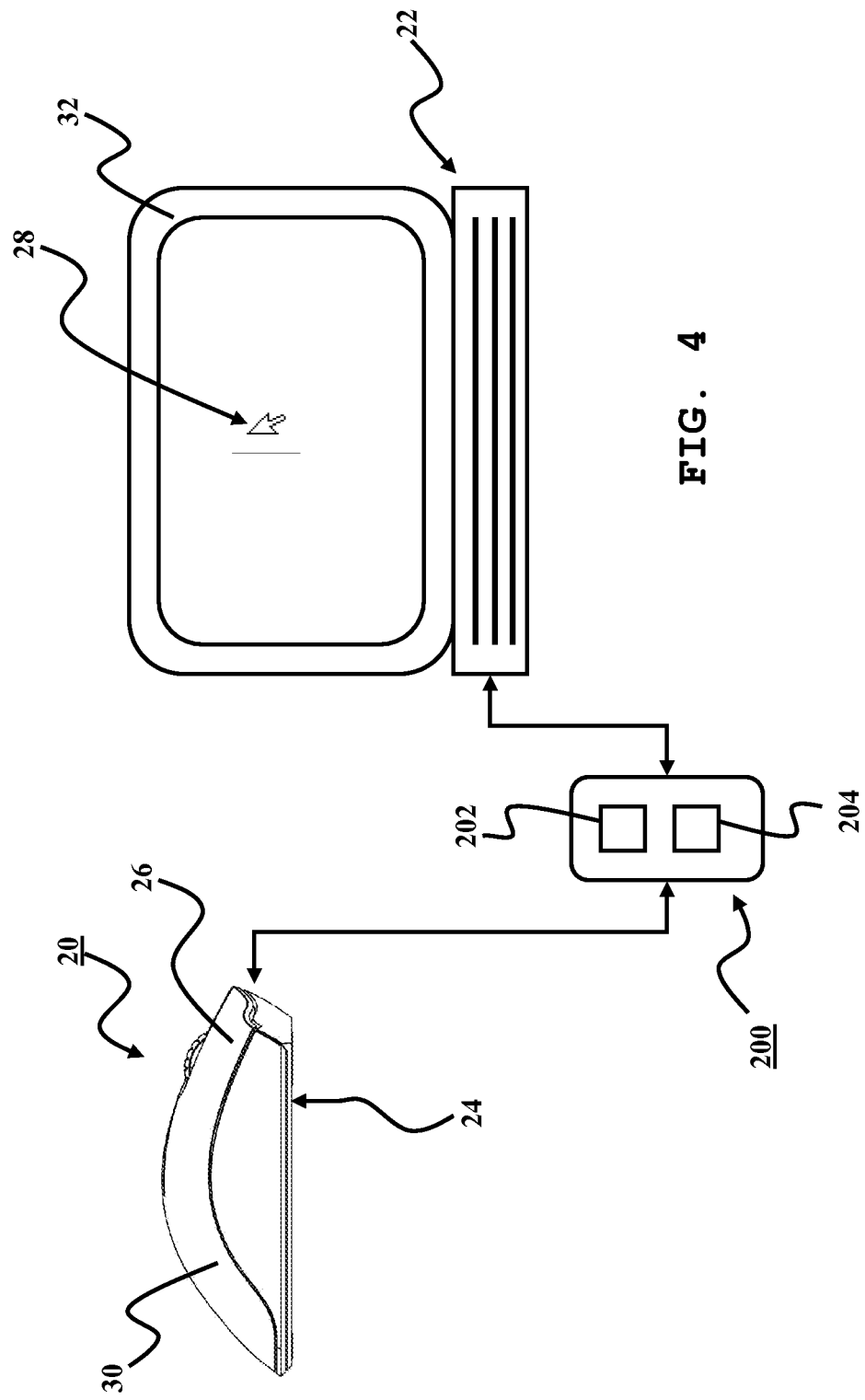
FIG. 4 shows a partial system block diagram of a system for implementing the method of FIG. 1.

The method 100 is further implementable using a system 200 for identifying unintended displacement as shown in FIG. 4. The system 200 comprises a controller 202 and a memory device 204. The memory device 204 contains a software program executable by the controller 202 for performing the method 100. The system 200 preferably signal interfaces the peripheral device 20 and the computing device 22. Upon receiving the displacement signals 42 from the peripheral device 20 and when performing the step 118 of the method 100, the controller 202 disables communication of the displacement signals 42 to the computing device 22 for impeding manipulation of the object 28 thereby when the sampled displacement 38 is identified as an unintended displacement. Alternatively, the controller 202 terminates the displacement signals 42 for impeding manipulation of the object 28 thereby when the sampled displacement 38 is identified as an unintended displacement.

Figure 5:
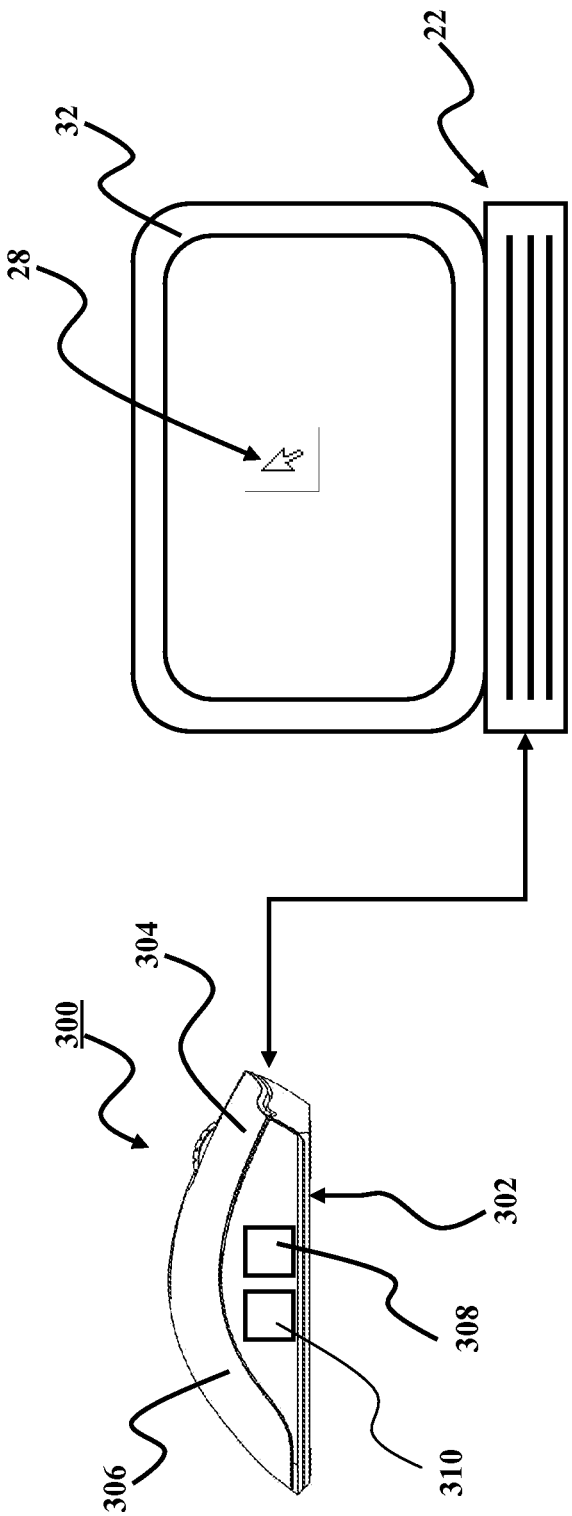
FIG. 5 shows a partial system block diagram of an apparatus for implementing the method of FIG. 1.

The method 100 is further implementable using an apparatus 300 for identifying unintended displacement as shown in FIG. 5. The apparatus 300 is preferably the peripheral device 20 and therefore comprises a transducer 302, a switch 304 and a body 306 functionally and configuratively corresponding with the transducer 24, the switch 26 and the body 30 of the peripheral device 20. The apparatus 300 further comprises a controller 308 and a memory device 310 housed within the body 306. The memory device 310 stores a software program executable by the controller 308, for example a firmware executable by a microprocessor, for performing the method 100. The transducer 302 and the switch 304 are coupled to the controller 308 for signal communication therewith. The controller 308 is further in signal communication with the computing device 22. Upon receiving the displacement signals 42 from the transducer 302 and when performing the step 118 of the method 100, the controller 308 disables communication of the displacement signals 42 to the computing device 22 for impeding manipulation of the object 28 thereby when the sampled displacement 38 is identified as an unintended displacement. Alternatively, the controller 308 terminates the displacement signals 42 for impeding manipulation of the object 28 thereby when the sampled displacement 38 is identified as an unintended displacement.

Additionally, the software program for performing the method 100 is operable in conjunction with a debounce program on the apparatus 300. During operation of the switch 304, switch bounce may occur which results in multiple activation of the switch 304 being detected and communicated to the computing device 22 although the switch 304 had been intentionally activated only once. Occurrence of the switch bounce is dependent on the specification, design and damping properties of the switch 304. When the controller 308 executes the debounce program, any activation of the switch 304 within a pre-determined bounce interval will be aggregated by the controller 308 and communicated as a single activation of the switch 304 to the computing device 22. When the software program for performing the method 100 is being operated in conjunction with the debounce program, the activation point 36 of the sampling interval 40 preferably is at the start of the bounce interval. Alternatively, the activation point 36 of the sampling interval 40 is at the end of or at any point during the bounce interval.

When the method 100 is implemented using the apparatus 300, the interval duration 44, the reference magnitude 50 and the reference rate are preferably stored on the memory device 310 of the apparatus 300. Additionally, the settings application is also stored on the memory device 310 and retrievable for execution by the controller 308 or the processor of the computing device 22 to enable a user to define or vary the interval duration 44, the reference magnitude 50 and the reference rate. The interval duration 44, the reference magnitude 50 and the reference rate are preferably stored on the memory device 310 of the apparatus 300 to allow portability thereof together with the apparatus 300.

In the foregoing manner, a method, a system and an apparatus for identifying and correcting unintended displacement are described according to an embodiment of the invention for addressing the foregoing disadvantages. Although only one embodiment of the invention is disclosed, it will be apparent to one skilled in the art in view of this disclosure that numerous changes and/or modification can be made without departing from the scope and spirit of the invention.

The invention claimed is:

1. A method implemented in a non-transitory storage medium, comprising:
   detecting activation of a switch;
   sampling displacement detected by a transducer occurring during a sampling interval in response to the switch being activated, the sampling interval having an activation point for initiating the sampling interval and the sampled displacement being transduced into displacement signals for manipulating an object generated by a computing device;
   determining at least one of displacement magnitude and displacement rate of the sampled displacement;
   identifying the displacement occurring during the sampling interval as an unintended displacement when at least one of the displacement magnitude is less than a reference magnitude and the displacement rate is less than a reference rate, wherein the unintended displacement is identified for impeding manipulation of the object by the displacement signals;
   providing a function executable for enabling one of varying and defining of at least one of duration of the sampling interval, the reference magnitude and the reference rate;
   storing the at least one of duration of the sampling interval, the reference magnitude and the reference rate on a memory device independent of the computing device;
   providing at least one function switch operable for varying at least one of the duration of the sampling interval, the reference magnitude and the reference rate; and
   providing a function executable for aggregating a plurality of activations of the switch within a bounce interval into a single activation of the switch and communicating the single activation of the switch to the computing device, and the activation point of the sampling interval is configurable to be activated at any time within the bounce interval,
   wherein the at least one function switch is at least one of a graphical user interface means and a first mechanical switch.

2. The method as in claim 1, further comprising:
   impeding manipulation of the object by the displacement signals when the unintended displacement is identified.

3. The method as in claim 1, impeding manipulation of the object by the displacement signals comprising:
   at least one of disabling communication of the displacement signals to a processor of the computing device and terminating the displacement signals.

4. The method as in claim 1, detecting activation of a switch comprising:
   detecting activation of a switch for executing a function on the computing device.

5. The method as in claim 1, wherein the switch is one of a second mechanical switch, a capacitive switch and an optical switch.

6. The method as in claim 1, wherein the switch is a button of a peripheral device.

7. The method as in claim 1, sampling displacement detected by a transducer occurring during a sampling interval comprising:
sampling displacement of one of a surface, a peripheral device and a ball rotatably coupled to the peripheral device,
wherein the transducer is coupled to the peripheral device for detecting the displacement.

8. The method as in claim 1, wherein the transducer is one of an electromagnetic transducer, an electromechanical transducer and a photoelectric transducer.

9. The method as in claim 1, determining at least one of displacement magnitude and displacement rate of the sampled displacement comprising:
providing a controller formed in one of the computing device and a peripheral device coupled to the computing device, the controller configured for communicating displacement signals between the transducer and a processor of the computing device; and
receiving and processing the displacement signals received by the controller for determining the at least one of displacement magnitude and displacement rate of the sampled displacement therefrom.

10. A system for communication with a computing device, the system comprising:
a peripheral device, the peripheral device having a switch and a transducer;
a controller configured for communication with the computing device,
wherein the controller performs the operations of:
detecting activation of the switch;
determining at least one of displacement magnitude and displacement rate of a sampled displacement detected by the transducer;
identifying the displacement occurring during the sampling interval as an unintended displacement when at least one of the displacement magnitude is less than a reference magnitude and the displacement rate is less than a reference rate, wherein the unintended displacement is identified for impeding manipulation of the object by the displacement signals; and
sampling displacement detected by the transducer occurring during a sampling interval in response to the switch being activated, the sampling interval having an activation point for initiating the sampling interval and the sampled displacement being transduced into displacement signals for manipulating an object generated by the computing device;
the system further comprising:
a function executable by at least one of a processor of the computing device and the controller for enabling one of varying and defining of at least one of duration of the sampling interval, the reference magnitude and the reference rate;
a memory device independent of the computing device for storing the at least one of duration of the sampling interval, the reference magnitude and the reference rate;
at least one function switch in communication with the controller, the at least one function switch being operable for varying at least one of the duration of the sampling interval, the reference magnitude and the reference rate; and
a function executable by the at least one of the processor of the computing device and the controller for aggregating a plurality of activations of the switch within a bounce interval into a single activation of the switch and communicating the single activation of the switch to the computing device, and the activation point of the sampling interval is configurable to be activated at any time within the bounce interval,
wherein the at least one function switch is at least one of a graphical user interface means and a first mechanical switch.

11. The system as in claim 10, the controller further configured for impeding manipulation of the object by the displacement signals.

12. The system as in claim 11, wherein impeding manipulation of the object by the displacement signals comprises at least one of disabling communication of the displacement signals to a processor of the computing device and terminating the displacement signals.

13. The system as in claim 10, wherein the switch is activatable for executing a function on the computing device.

14. The system as in claim 10, wherein the switch is one of a second mechanical switch, a capacitive switch and an optical switch.

15. The system as in claim 10, wherein the switch is a button formed on the peripheral device.

16. The system as in claim 10, wherein the transducer detects the displacement of one of a surface, a peripheral device and a ball rotatably coupled to the peripheral device for transducing into the displacement signals.

17. The system as in claim 10, wherein the transducer is one of an electromagnetic transducer, an electromechanical transducer and a photoelectric transducer.

18. The system as in claim 10, the controller further configured for receiving and processing the displacement signals for determining the at least one of displacement magnitude and displacement rate of the sampled displacement therefrom.

19. An apparatus for communication with a computing device, the apparatus comprising:
at least one processor; and
non-transitory memory including instructions that, when executed by the at least one processor, cause the apparatus to:
detect activation of a switch;
ample displacement detected by a transducer occurring during a sampling interval in response to the switch being activated, the sampling interval having an activation point for initiating the sampling interval and the sampled displacement being transduced into displacement signals for manipulating an object generated by a computing device;
determine at least one of displacement magnitude and displacement rate of the sampled displacement; and
identify the displacement occurring during the sampling interval as an unintended displacement when at least one of the displacement magnitude is less than a reference magnitude and the displacement rate is less than a reference rate,
wherein the unintended displacement is identified for impeding manipulation of the object by the displacement signals;
execute a function for enabling one of varying and defining of at least one of duration of the sampling interval, the reference magnitude and the reference rate;

store the at least one of duration of the sampling interval, the reference magnitude and the reference rate on a memory device independent of the computing device;

vary at least one of the duration of the sampling interval, the reference magnitude and the reference rate in response to at least one function switch being operable; and execute a function for aggregating a plurality of activations of the switch within a bounce interval into a single activation of the switch and communicating the single activation of the switch to the computing device, and the activation point of the sampling interval is configurable to be activated at any time within the bounce interval, wherein the at least one function switch is at least one of a graphical user interface and a first mechanical switch.

20. The apparatus as in claim 19, the controller is further for impeding manipulation of the object by the displacement signals when the unintended displacement is identified.

21. The apparatus as in claim 20, the controller impedes manipulation of the object by the displacement signals by at least one of disabling communication of the displacement signals to the computing device and terminating the displacement signals.

22. The apparatus as in claim 19, wherein the switch is activatable for executing a function on the computing device.

23. The apparatus as in claim 19, wherein the switch is one of a second mechanical switch, a capacitive switch and an optical switch.

24. The apparatus as in claim 19, further comprising:
a body for housing the controller, the transducer, the switch and the memory device,
wherein the switch is a button formed on the body.

25. The apparatus as in claim 24, wherein the transducer detects the displacement of one of a surface, the body and a ball rotatably coupled to the body for transducing into the displacement signals.

26. The apparatus as in claim 19, wherein the transducer is one of an electromagnetic transducer, an electromechanical transducer and a photoelectric transducer.

27. The apparatus as in claim 19, the controller further for receiving and processing the displacement signals for determining the at least one of displacement magnitude and displacement rate of the sampled displacement therefrom.

28. A non-transitory machine-readable medium having stored therein a plurality of programming instructions, which when executed, the instructions cause a machine to:
detect activation of a switch;
sample displacement detected by a transducer occurring during a sampling interval in response to the switch being activated, the sampling interval having an activation point for initiating the sampling interval and the sampled displacement being transduced into displacement signals for manipulating an object generated by a computing device;
determine at least one of displacement magnitude and displacement rate of the sampled displacement; and
identify the displacement occurring during the sampling interval as an unintended displacement when at least one of the displacement magnitude is less than a reference magnitude and the displacement rate is less than a reference rate,
wherein the unintended displacement is identified for impeding manipulation of the object by the displacement signals;

execute a function for enabling one of varying and defining of at least one of duration of the sampling interval, the reference magnitude and the reference rate;

store the at least one of duration of the sampling interval, the reference magnitude and the reference rate on a memory device independent of the computing device;

vary at least one of the duration of the sampling interval, the reference magnitude and the reference rate in response to at least one function switch being operable; and execute a function for aggregating a plurality of activations of the switch within a bounce interval into a single activation of the switch and communicating the single activation of the switch to the computing device, and the activation point of the sampling interval is configurable to be activated at any time within the bounce interval, wherein the at least one function switch is at least one of a graphical user interface and a first mechanical switch.

29. The non-transitory machine-readable medium as in claim 28, wherein the plurality of programming instructions, which when executed, the instructions cause the machine to:
impede manipulation of the object by the displacement signals when the unintended displacement is identified.

30. The non-transitory machine-readable medium as in claim 28, wherein the plurality of programming instructions, which when executed, the instructions cause the machine to:
at least one of disable communication of the displacement signals to the processor of the computing device and terminate the displacement signals.

31. The non-transitory machine-readable medium as in claim 28, wherein the plurality of programming instructions, which when executed, the instructions cause the machine to:
detect activation of a switch for executing a function on the computing device.

32. The non-transitory machine-readable medium as in claim 28, wherein the switch is one of a second mechanical switch, a capacitive switch and an optical switch.

33. The non-transitory machine-readable medium as in claim 28, wherein the switch is a button of a peripheral device.

34. The non-transitory machine-readable medium as in claim 28, wherein the plurality of programming instructions, which when executed, the instructions cause the machine to:
sample displacement of one of a surface, a peripheral device and a ball rotatably coupled to the peripheral device,
wherein the transducer is coupled to the peripheral device for detecting the displacement.

35. The non-transitory machine-readable medium as in claim 28, wherein the transducer is one of an electromagnetic transducer, an electromechanical transducer and a photoelectric transducer.

36. The non-transitory machine-readable medium as in claim 28, wherein the plurality of programming instructions, which when executed, the instructions cause the machine to:
receive and process the displacement signals received by a controller for determining the at least one of displacement magnitude and displacement rate of the sampled displacement therefrom,
wherein the controller is formed in one of the computing device and a peripheral device coupled to the computing device, the controller configured for communicating displacement signals between the transducer and a processor of the computing device.

* * * * *